UNITED STATES PATENT OFFICE.

LEOPOLD CHARLES URBAN, OF MILWAUKEE, WISCONSIN, ASSIGNOR OF ONE-HALF TO ALBERT KREMERS, OF SAME PLACE.

CARVACROL IODID.

SPECIFICATION forming part of Letters Patent No. 561,531, dated June 2, 1896.

Application filed September 17, 1895. Serial No. 562,801. (Specimens.)

*To all whom it may concern:*

Be it known that I, LEOPOLD CHARLES URBAN, a citizen of the United States, and a resident of Milwaukee, in the county of Milwaukee and State of Wisconsin, have invented certain new and useful Improvements in Antiseptic Compounds and Methods of Producing the Same; and I do hereby declare that the following is a full, clear, and exact description thereof.

My invention relates to the manufacture of a new iodin-substitution product from carvacrol; and it consists in the method of forming this said new product, as well as in the new product thus made, all as will be fully set forth hereinafter, and subsequently claimed.

The object of my invention is the production of a substitute for iodoform which possesses all of its valuable antiseptic qualities and which is a cheaper product, inasmuch as it has about three times the bulk of iodoform, pound for pound, which is a great advantage, inasmuch as the principal use of my compound is as a dusting powder over wounds and the like, and, further, is greatly superior in that my compound is practically odorless.

In preparing my compound I take two parts, by weight, of carvacrol and four parts, by weight, of sodium hydroxid (commercial sodium hydroxid, containing about four molecules to one molecule of the carvacrol) and dissolve these ingredients in about twenty parts, by weight, of water, which results in a few minutes in a clear solution. I next prepare a ten per centum aqueous solution of iodin in potassium iodid and add about seventeen parts, by weight, of this second solution to the first-named solution (in the proportions hereinbefore given therefor) under continuous stirring at a temperature of about 15° centigrade, which results in the formation of a yellowish-gray or buff-colored voluminous precipitate constituting my new product.

The same product may be formed by first adding to the described alkaline solution of carvacrol 3.67 parts of potassium iodid (or an equivalent of sodium iodid) and next by adding to this mixture a solution of an alkaline hypochlorite (preferably sodium hypochlorite) under continuous stirring at about 15° centigrade until no more of the precipitate is formed.

The precipitate is separated by filtration and carefully washed with cold distilled water. In working with large quantities it is best to add a trace of alkali to the water used in washing, so as to prevent decomposition, which is liable to occur when the mass is dried in thick layers. This precipitate is spread out, either on bibulous paper or porous tiles, and air-dried at a temperature of, say, from 15° to 18° centigrade.

The final product represents an amorphous, almost odorless, yellowish-gray or buff-colored powder, insoluble in water and alkali, sparingly soluble in alcohol, and readily soluble in ether, chloroform, benzene, or other light and volatile petroleum distillates, and in various expressed vegetable oils, such as olive-oil, cotton-seed oil, and the like.

My said product, obtained as hereinbefore stated, begins to shrink (when heated in a capillary tube) at about 107° centigrade and is melted to a brown liquid at about 153° centigrade. When it is purified by solution in ether and precipitation with alcohol, it does not show signs of shrinking until about 170° centigrade, changing gradually to a tarry mass; but at tests where the temperature was raised to 210° centigrade the mass had not liquefied. The powder is apparently not influenced by the action of sunlight and does not deteriorate after being kept for months.

In dusting this product over wounds and cuts it is used exactly like iodoform, and it may be also used in the form of ointments and solutions in precisely the same manner and proportions, by weight, as iodoform is used. This substance is soluble in ether or olive-oil and a five per centum solution may be injected into a tuberculous arm or knee, or this product may be dissolved in collodion (from two to five per centum solution) and then painted over a burn or wound just as collodion is.

Having thus described my invention, what I claim as new, and desire to secure by Letters Patent, is—

1. The herein-described process of manufacturing an antiseptic compound, consisting in adding to a given quantity of carvacrol about double the quantity, by weight, of commercial sodium hydroxid, and dissolving the same in water, forming a clear solution; next, adding to this described aqueous alkaline solution, an aqueous iodin solution, under continuous stirring, at about 15° centigrade, forming a yellowish-gray or buff-colored precipitate, and continuing this addition and agitation until no more of the said precipitate is formed; next, separating this precipitate by filtration, and carefully washing it with cold distilled water, and finally spreading out the purified mass on an absorbent surface, and air-drying the said precipitate at a temperature of about 15° to 18° centigrade.

2. The hereinbefore-described new iodin-substitution product of carvacrol, consisting of an amorphous practically odorless powder of a yellowish-gray or buff color, insoluble in water and alkali, sparingly soluble in alcohol, and readily soluble in ether, chloroform, benzene or other light and volatile petroleum distillates and in various expressed vegetable oils, such as olive-oil, cotton-seed oil, and the like, and incapable of melting under about 153° centigrade.

In testimony that I claim the foregoing I have hereunto set my hand, at Milwaukee, in the county of Milwaukee and State of Wisconsin, in the presence of two witnesses.

LEOPOLD CHARLES URBAN.

Witnesses:
H. G. UNDERWOOD,
B. ROLOFF.